Feb. 9, 1954    J. A. HJULIAN    2,668,452
REVERSING MECHANISM
Filed Dec. 17, 1952    5 Sheets-Sheet 5

Inventor:
Julius A. Hjulian,
By Joseph O. Lange
Atty.

Patented Feb. 9, 1954

2,668,452

UNITED STATES PATENT OFFICE 2,668,452

REVERSING MECHANISM

Julius A. Hjulian, Palos Heights, Ill., assignor to Crane Co., Chicago, Ill., a corporation of Illinois Application December 17, 1952, Serial No. 326,382

10 Claims. (Cl. 74—323)

This invention relates to a valve testing machine or similar device. More particularly, it pertains to an automatic shaft reverser and torque governor machine which is preferably employed in predeterminately transmitting power from a given supply source.

Although, as will hereinafter be understood, the practical applications of this invention are extensive, for clarity of understanding, the following description will treat largely of a single application, namely, the repeated operation encountered in the closing and opening of a valve having a rotating stem in simulation to actual service.

Thus, it is a broad objective of this invention to provide a machine which will effect transmission of rotary motion to a valve stem or the like wherein a predetermined and preset maximum valve closing torque may be applied to the valve stem and whereupon the valve stem rotation will be automatically reversed for a predetermined number of revolutions in the direction of opening after which the stem rotation will again be automatically reversed, while the power supply means operates continuously in but one direction.

It is another object of this invention to provide a machine for transmitting continuous rotary motion and predeterminately limiting the torque on the driven shaft and also the number of revolutions in one direction of rotation thereof while the machine is adjustable in these functions.

The present invention constitutes an improvement over the subject matter of co-pending application Serial No. 199,299, filed by the same inventor on December 5, 1950. It provides more specifically for a machine of the above type which includes cushioning means for the torque limiting mechanism to prevent breakage or injury and to prolong smooth operation and the life of the same and of the over-all machine.

The present invention further provides for more responsive and positive action of the reversing mechanism in disengagement of rotary power in the direction of valve closing upon reaching the predetermined preset torque. This is particularly desirous and necessary for higher torque settings as increased loading of the drive and clutch members makes release of the latter more difficult and uncertain.

Other objects and advantages of the invention will become apparent upon proceeding with the following description read in light of the accompanying drawings in which.

Similar reference numerals refer to similar parts throughout the several views.

Figure 1:
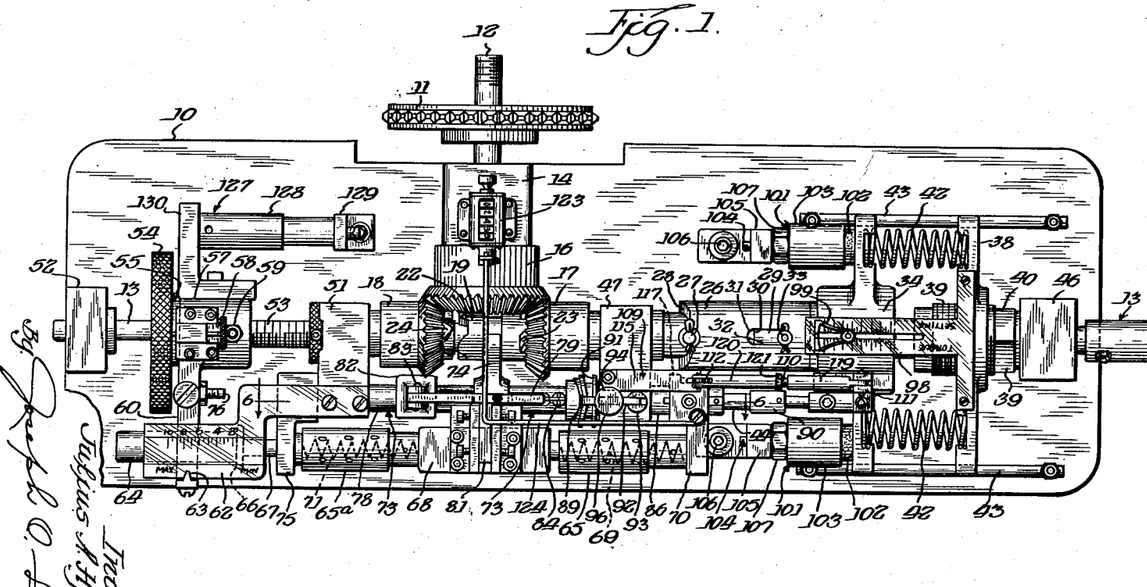
Fig. 1 is a plan exterior view of a preferred embodiment of this invention.
Figure 2:
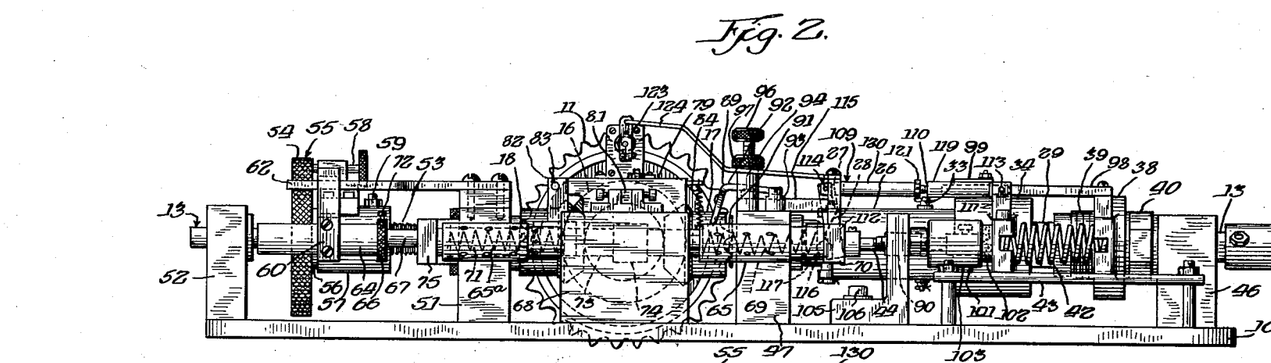
Fig. 2 is a front elevation of the structure of Fig. 1.

As shown in Fig. 1, the improved machine is mounted on a base plate 10 having suitable holes therethrough for bolting to a casing (not shown) or other means which may enclose the entire mechanism if desired. A conventional power drive means (not shown) is preferably employed, such as an electric motor and being connected to shaft 12 as by sprocket and chain 11 or by gearing for counterclockwise rotation thereof as viewed from the front or Fig. 2 position. Shaft 13 at the output end of the machine extends from said casing at the right in Fig. 2 to suitably connect to the exterior end of a rotatable valve stem of the valve being tested (not shown) for repeated closing and opening operations and other tests as will be hereinafter described. The direction of rotation of the extended shaft 13 at the right is determined by gearing and clutch engagement to be later described, and rotation of the valve stem will be assumed to be in accordance with standard practice, i. e., clockwise for closing when looking down on the valve.

Following the motion of the mechanism from said drive means, it will be noted that a bearing 14 mounted on the base plate 10 supports the driven shaft 12. The latter member has a bevel gear 16 secured to the end thereof in a conventional manner. Two oppositely disposed bevel gears 17 and 18 constantly mesh with the bevel gear 16 and are mounted on the shaft 13 so as to be free to rotate relative thereto.

Mounted on the shaft 13 between the bevel gears 17 and 18 is a cylindrical double dog clutch member 19 having inner peripheral longitudinal grooves 21 (see Fig. 4) to receive corresponding splines 22 of the shaft 13 whereupon the dog clutch member 19 is axially moved by means hereinafter described. Driven clutch members 23 and 24, which are relatively nonrotatably mounted within bevel gears 17 and 18, respectively, are separately engageable by the slidable dog clutch member 19 to transmit the driving power to the shaft 13 in either direction of rotation thereof depending upon which of the driven clutch members 23 and 24 is engaged.

Assuming that the sliding clutch member 19 is engaged with driven clutch member 23 as shown in Fig. 1, shaft 13 will rotate clockwise when viewed from the left, that is, in the direction of valve closure, until a preset resisting torque is applied thereto as by seating of the valve disc. The influence of said resisting torque on the shaft 13 causes a sleeve 26 mounted thereon to move axially outward or toward the right as two diametrically opposite roller end portions of a shaft roller pin 27 move by rotation of shaft 13 on two respective cam surfaces 28 located on the inward end of the sleeve 26. It should be noted that roller pin 27 is received in notches in the sleeve 26 for effecting more positive drive and that cam surfaces 28 are gradual and extend nearly to the bottoms of the notches for relatively easy withdrawal of the roller pin by axial displacement of the sleeve when the shaft is subjected to the preset resisting torque. On the other hand, sleeve 26 is not as readily shifted when under reverse rotation because the notches are deeper on the opposite sides. Shifting or displacement in this instance is a safety measure and does not enter in the normal operation of the machine as does displacement during clockwise rotation.

It should also be noted that shaft 13 is formed of two sections 29 and 31 coming together within the sleeve 26 at 30 thereby permitting relative rotation therebetween when the resisting torque stops rotation of the end section 29. Since the driving power is continuous, the opposite shaft section 31 continues to rotate, causing roller pin 27 to ride on the cam surfaces 28. Rotation of shaft section 29 in either direction is effected through roller pin 27 which bears relatively tightly within the notches in the sleeve 26 by means hereinafter to be described. Two diametrically opposite longitudinal slots 32 are provided in the sleeve 26 to receive opposite ends of a shaft pin 33, thereby allowing for the axial displacement of the said sleeve while transmitting rotation.

Figure 3:
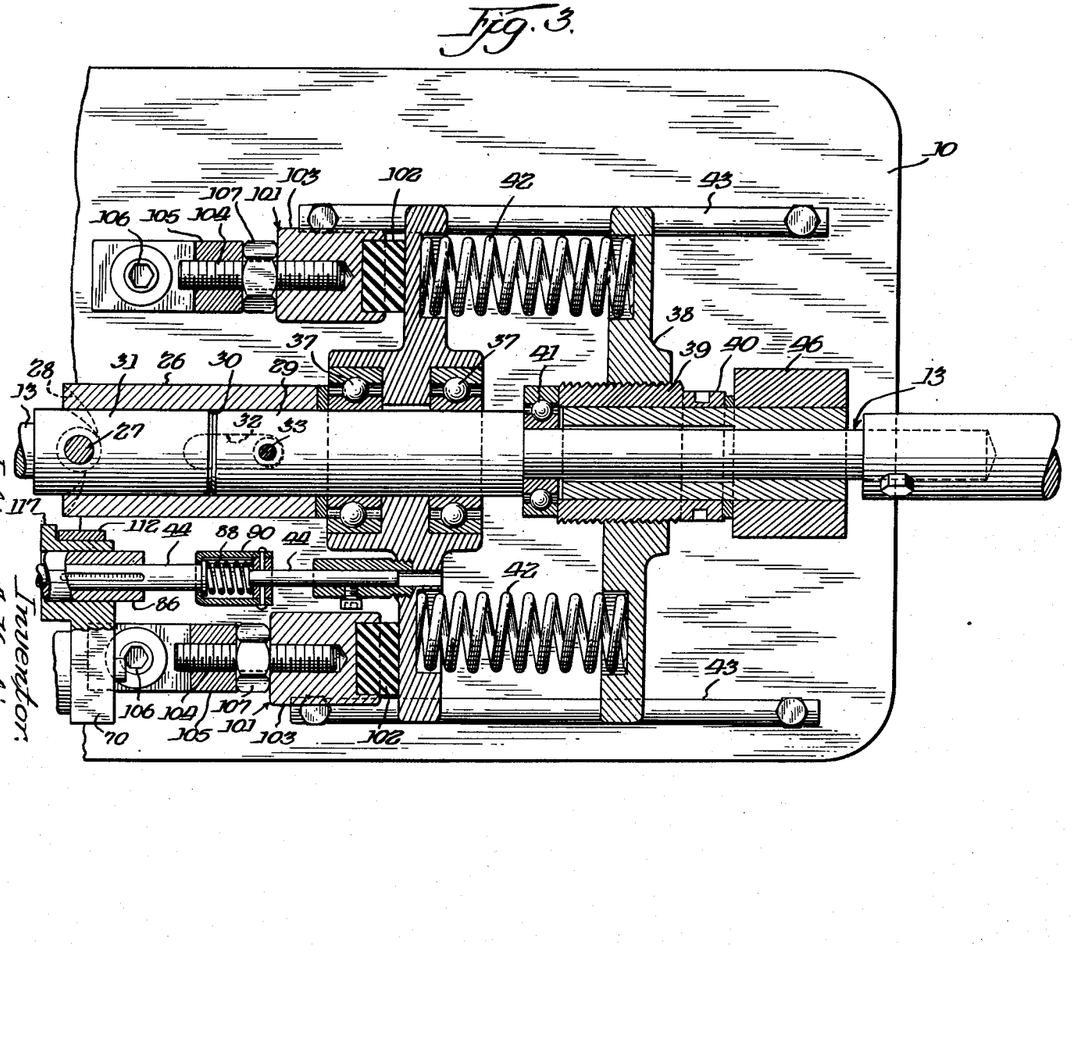
Fig. 3 is an enlarged fragmentary sectional plan view of an end portion of Fig. 2.

It will be noted that the outer end of sleeve 26 abuts an axially movable non-rotatable yoke 34 mounted on shaft section 29 and having ball bearings 37 therein, as shown in Fig. 3. Another non-rotatable yoke 38 is threadedly mounted on bushing 39 on the outer end of the shaft section, ball bearings 41 being preferably provided for free rotation of the shaft section therethrough. As shown in Figs. 1 and 3, two springs 42 of predetermined loading strength are disposed between the two yokes 34 and 38 which are supported upon two (2) crossbars 43, the latter members being mounted on the base plate 10 under the ends of the yokes 34 and 38. Thus, under the influence of the springs 42, yoke 34 is held inwardly against the sleeve 26 which in turn is held in tight abutting relation against roller pin 27 for the above described rotational drive of shaft section 29. Thus, when sleeve 26 is moved outwardly, yoke 34 is carried outwardly with it, and with it also the rod 44 which is connected to the yoke, the axial movement of the latter member effecting reversal of the shaft 13 by shifting the sliding clutch member 19 in a manner hereinafter described.

It should be understood that the strength of the springs 42, against which yoke 34 and sleeve 26 move, determines the limit of the allowable resisting torque. Since yoke 38 is mounted on threaded bushing 39, axial adjustment is provided by rotation of the latter through nut portion 40. This adjustment permits preloading of springs 42 to any desired compression within their effective range thereby providing for variable setting of the resisting torque necessary to cause axial movement or displacement of sleeve 26. A scale 98, preferably calibrated in foot pounds and mounted on yoke 38, permits setting of the desired maximum torque to be applied to the valve being tested, said torque setting being indicated by a marker or indicator 99 mounted on yoke 34 and extending through a slot in the scale. Also, the springs 42 may be easily removed from the yokes 34 and 38 and replaced by springs having a different strength characteristic if there is a need for a further change in the spring resistance. In the latter case, the torque scale can, of course, be replaced by one having a different torque range. Shaft section 29 is supported by a conventional bearing 46, while section 31 is supported by suitable bearings 47, 51, and 52. A dial 54, having an internally threaded sleeve 56 non-rotatably connected therewith (see Fig. 5), is mounted on the latter shaft section, cooperating with the shaft threads 53 for reciprocal movement thereon. A cylindrical member 57 mounted over the sleeve 56 normally maintains the dial 54 in non-rotative relation with the shaft 13 by means of a spring loaded pin 58 which is mounted on the cylindrical member 57 to be received within holes in the outer rim of the dial 54. The cylindrical member 57 is held in non-rotative relation by an arm 60 which extends therefrom, member 57 being axially movable along said shaft with the dial 54 by means of a screw 59 extending through the member 57 and into a circumferential groove 61 in the sleeve 56 (see Fig. 5). Thus, the dial 54 may be adjustably positioned on the shaft 13 by withdrawing the pin 58 from a dial hole and threadedly moving the dial sleeve 56 along the shaft 13. By the above adjustment, the exact number of shaft revolutions may be provided for before reversal of the shaft 13 takes place. A more detailed description of the latter feature is hereinafter given. A scale 62 may be fixedly positioned to indicate, through a pointer 63 connected to the arm 60, the number of shaft revolutions before reversal thereof.

Continuing with a description of the structure and the operation of the machine, when the dog clutch member 19 is engaged with the driven clutch member 23, the dial assembly, generally designated 55, moves outwardly or to the left on the threaded shaft 13 until the preset resisting torque is applied thereto. Said resisting torque reverses the direction of shaft rotation by shifting the clutch member 19 in a manner hereinafter described to be engaged by driven clutch member 24, the dial assembly 55 then moving inwardly or to the right on the shaft 13. During inward movement of a predetermined amount, the arm 60 which is apertured for the reception of cylinder 64 slides over the same until its abuts a collar 66 on the inner end thereof, as best shown in Fig. 5. The cylinder 64 is threaded on a rod 67 which extends through a mounting 68, best seen in Fig. 4, and operates by further inward movement of the dial assembly on two springs 69 and 71 within casings 65 and 65a respectively which are compressed by virtue of the construction shown in that figure. The amount of spring compression may be adjusted by rotation of the cylinder 64 on the rod 67 as apparent in Fig. 5, a screw 72 being provided (see Fig. 2) which extends through the collar 66 to interlock the two members 64 and 67 together. The springs 69 and 71 are preferably positioned within the telescoping casings 65 and 65a which contain apertures to prevent possible sluggish action of air compression, binding, or the like.

It should here be noted that a clutch actuator member 73 is supported by the bearings 47 and 51 and slides therein under the influence of the springs 69 and 71 in a manner hereinafter described. End portions 70 and 75 of the actuator member 73 are adjacent the outer ends of springs 69 and 71, respectively, member 73 thereby being positioned by spring action. The central portion of the member 73 contains a guide 74 which contacts the sliding clutch member 19 to transmit the displacement of the member 73 thereto while permitting free rotation of the same. Thus, it will be understood that the action of the springs 69 and 71 provides for the positioning of the dog clutch member 19 which in turn affects the direction of rotation of the shaft 13.

At substantially the inward limit of dial assembly movement, a pin 76 projecting from the arm 60 abuts a rod 77 (see Figs. 4 and 5) disposed within a sleeve portion 78 of the member 73. The pin 76 moves the rod 77 axially inward during further inward movement of the dial assembly to release a catch 79 (see Fig. 7) which is pivotally mounted on the member 73, the catch normally securing the member 73 against the influence of the springs 69 and 71 (see Fig. 1). An end of the catch 79 is received within a slotted shank 82 of the member 73 shown in Fig. 6, a pin 83 pivotally securing the catch to the shank 82. Thus, release of the catch 79 by inner movement of the dial assembly 55 permits spring 69 to shift the member 73 and the dog clutch member 19 as hereinafter described. The clutch member 19, thus shifted, again engages the driven clutch member 23, and thereby reverses the rotation of the shaft 13.

Figure 4:
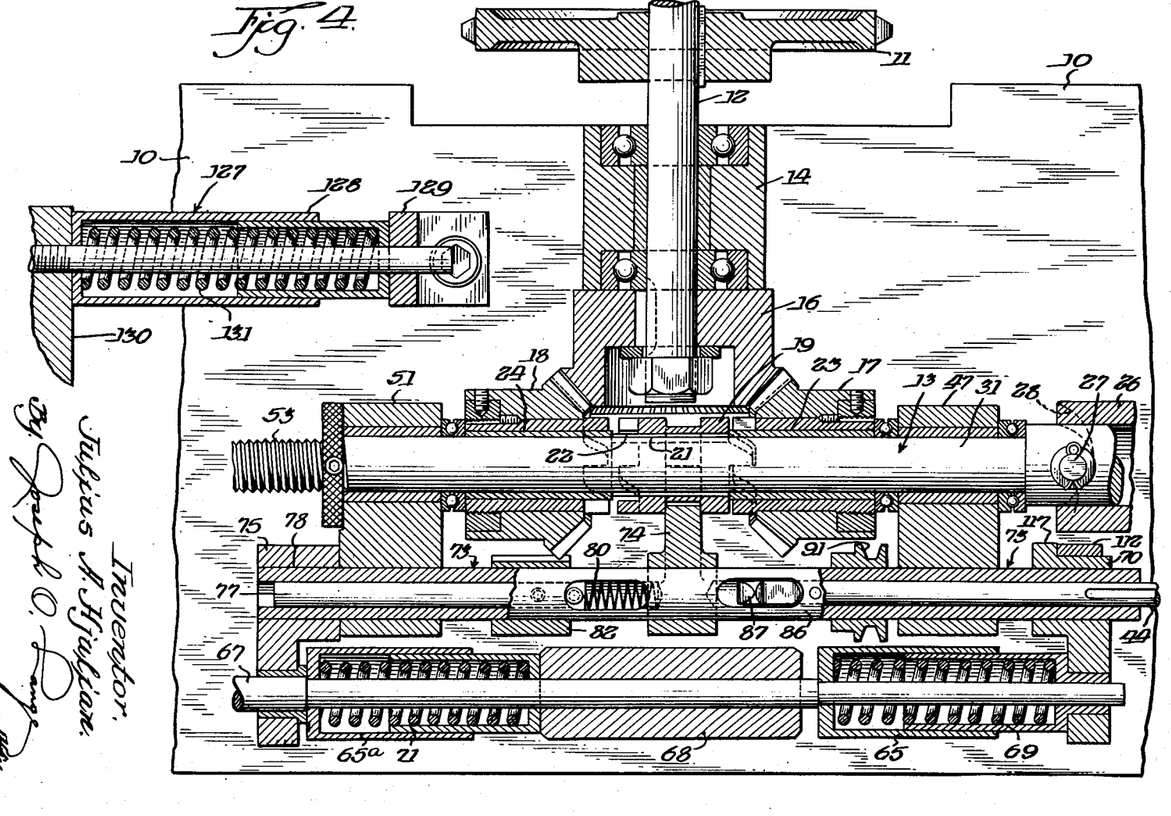
Fig. 4 is an enlarged fragmentary sectional plan view of an intermediate portion of Fig. 2.
Figure 5:
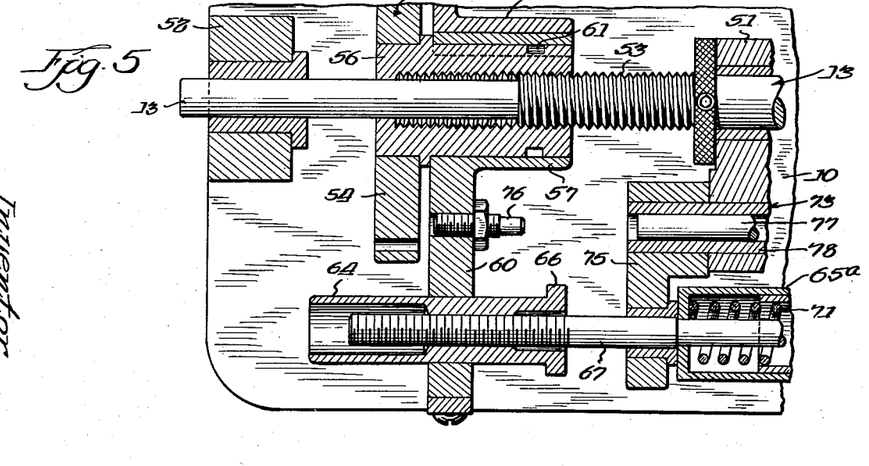
Fig. 5 is an enlarged fragmentary sectional plan view of the opposite end portion of Fig. 2.
Figure 6:
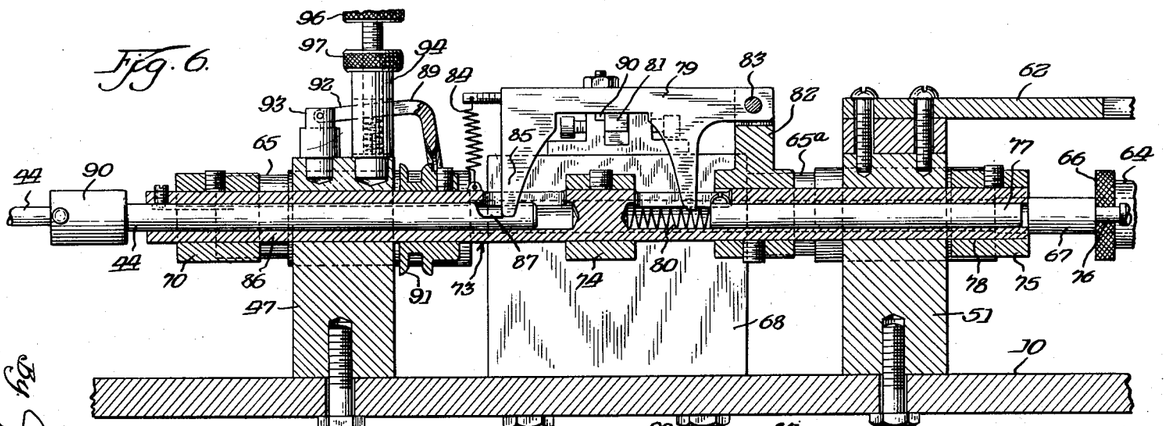
Fig. 6 is an enlarged fragmentary sectional view taken on line 6—6 of Fig. 1.

Referring to Fig. 4, the rod 77 is preferably spring loaded by means of spring 80 which is disposed within the sleeve 78 to effect the return of the rod to the original position. Also, catch 79, as shown in Fig. 6, is yieldingly held downward by the spring 84 which is connected to the member 73, said catch member being supported in the downward or lowest position by the bar 81 projecting from the mounting 68. When the catch 79 is returned to the downward position by the spring 84 after release by the rod 77 and shifting of the actuator 73, the actuator is thereby prevented from shifting back to its previous position by a stop pin 90 projecting through the catch 79 to abut the bar 81. Thus, the spring 71 is maintained partially compressed by abutting the end 75 of the member 73 while the dial assembly 55 is moving outwardly.

The preset resisting torque becomes effective when the dial assembly has returned to its outer position causing the rod 44 to move outwardly by the means previously described. An inward portion of the rod 44 is received within a sleeve portion 86 of the member 73, as shown in Fig. 6, and a groove 87 at the inner end of the rod 44 receives a downwardly projecting end 85 of the catch 79, the latter member being retained against the influence of the springs 69 and 71 by means of the stop pin 90 abutting the bar 81. Thus, the outward movement of the rod 44 lifts the catch 79 to permit spring 71 to shift the member 73, and to place clutch member 19 in engagement with driven clutch member 24.

Rod 44, as shown in Fig. 3, is provided with a spring 88 within a sleeve 90 which allows for relatively slight adjustments in the length of the rod. Also, spring 88 urges rod 44 with groove 87 inwardly so as to be in position to receive the downwardly projecting end 85 of the catch 79 upon shifting of the member 73 back again.

The sliding clutch member 19 may be locked in a neutral position by means of a fork member 89 retained within a circumferential recess or groove 91 within a collar on the member 73. The locking fork 89 may be positioned on an extension 92 which is pivotally pinned on a shank 93 of the bearing 47 and projecting through a stem 94 on the said bearing. Fig. 6 shows screw 96 in the top of the stem 94 which can be turned down on top of the extension 92, thereby securing the locking fork 89 in the grooves 91, while a spring in the stem 94, acting underneath the extension 92, normally suppotrs the fork 89 and out of engagement with the grooves 91.

The locking mechanism is also used in connection with setting the machine for a certain number of shaft revolutions as follows: Assuming that eight (8) revolutions are to be applied to the stem of a particular valve to be tested for the opening movement thereof, the machine is set preparatory to the valve being mounted thereon by lifting the catch 79 and sliding the latter member to the neutral position, locking the same by loosening locknut 97 and turning screw 96 downwardly to engage the locking fork 89 in recess 91, rotating the driver (not shown) at the output end of shaft 13 in the direction of valve closing until the dial assembly 55 has moved outwardly and the pointer 63 indicates the desired number of turns, at which time the actuator member 73 is released from the neutral position by turning screw 96 upwardly and the locknut 97 tightened.

Figure 7:
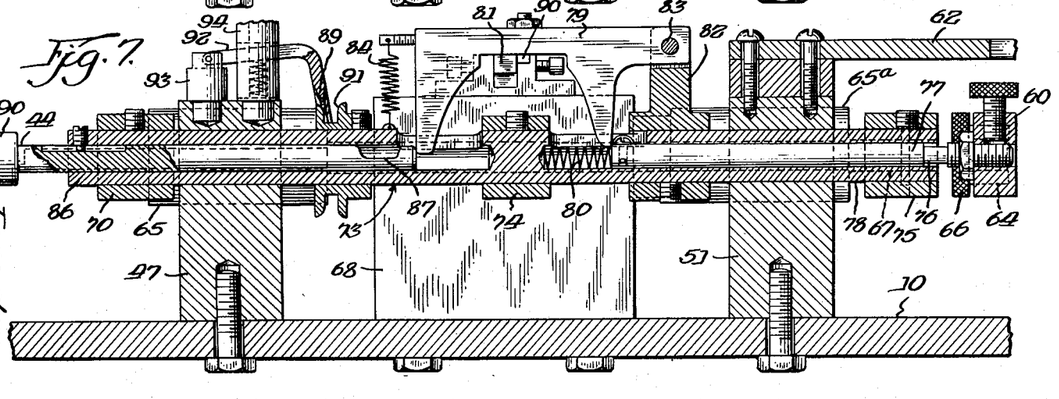
Fig. 7 is a fragmentary sectional view similar to Fig. 6, but showing a section taken at different operative position of the device.

A summary of the automatic reversal of shaft 13 is now given in connection with Figs. 6 and 7. Fig. 6 shows the details of the catch mechanism when the machine is in the position shown in Figs. 1 through 5. Fig. 7 shows the same section as that of Fig. 6, after the machine has operated to reverse the shaft.

Thus, in Fig. 6, actuator member 73 is secured to the left by means of the catch 79 being held in locked relation with the bar 81 by means of the stop pin 90 in cooperation with spring 84, thereby providing engagement of clutch member 19 with driven clutch member 23 (see Fig. 1) and rotation of the shaft 13 in the direction of valve closing. The predetermined maximum torque to be applied to the valve stem and set on the torque scale 98 will become effective upon seating of the valve gate or closure member (not shown) to cause the shaft section 29 to close rotation and cause the roller pin 27 to roll on cam 28. Yoke 34 is thus outwardly displaced as is rod 44 connected thereto, and the following described spring loading or cocking and releasing, or trigger action, then takes place.

Again referring to Fig. 6, displacement of rod 44 to the left releases catch 79 by withdrawal of groove 87 from the end 85 of catch 79 camming the same upwardly and lifting the stop pin 90 over the bar 81. Spring 71 having been placed under compression as previously described then acts against the actuator end 75 to shift the now released actuator 73 to the right as shown in Fig. 7. Catch 79 is returned to its downward position by spring 84, stop pin 90 engaging bar 81 to secure the same and the actuator 73 upon which it is mounted against displacement to the left.

Shifting of the actuator 73 as above described places the clutch member 19 in engagement with driven clutch member 24 thereby reversing the rotation of shaft 13, as apparent from Fig. 1. Such rotation then actuates the dial assembly 55 in an inward direction. As previously noted in connection with Fig. 4, inward movement of this assembly effects inward movement of rod 67 which comprises springs 69 and 71 within the casings 65 and 65a by shouldering on their respective casing end portions. Continued inward movement of the dial assembly 55 places the pin 76 against rod 77 as shown in Fig. 7 and further movement forces rod 77 against the catch 79, releasing the latter by raising the stop pin 90 above the bar 81. Spring 69 within casing 65 then shifts the actuator member 73 to the right and back to the position shown in Fig. 6 through abutting contact with end portion 70 thereof. The spring 71 in casing 65a is thus secured in a compressed condition by actuator 73 being maintained in the Fig. 6 position by the catch 79.

To prevent breakage of or injury to the shaft roller pin 27 and to otherwise insure smooth operation of the torque limiting mechanism and materially prolong the efficient life of the overall machine, cushioning means generally designated 101 are provided at each side to absorb the impact of the spring urged yoke 34, thereby shielding the roller pin 27 from the repeated blows it would otherwise receive from the sleeve 26 and protecting the cam surfaces of the latter member from being distorted or pounded out of shape, particularly under the higher torque settings, as for example, when heavier springs are employed. Each of the cushioning means or shock absorbers comprises resilient material, such as rubber 102, received within a cylindrical casing 103 but extending therebeyond for providing a yielding contact with the yoke 34. These casings are in approximate axial alignment with the coil springs 42 at each side of the yoke, being threadedly mounted on studs 104 extending thereinto, which in turn are supported by the posts 105, the latter being attached to the base plate 10 by suitable means, such as bolts 106. The cushioning means are rendered axially adjustable by rotation of the casings 103 on the studs 104 to provide for even engagement of the two sides of the yoke 34 therewith, thus reducing wear and making for more efficient operation. Locknuts 107 secure the casings in proper position for said uniform buffer action.

Cooperating with the cushioning means 101 in effecting smoother operation and prolonging the life of the machine, is a clutch release assembly generally designated 109 which assists the reversing mechanism 73 in making more positive and instantaneous release of the sliding clutch member 19 from the driven clutch member 23 when shaft 13 is subjected to the present resisting torque during the closing of the valve being tested.

This assembly comprises a link member 110 pivotally mounted at opposite ends to a projecting portion 111 of yoke 34 and to a lever 112 as by means of the pins 113 and 114, respectively. The lever is pivotally supported intermediate its ends by a slotted bar 115 mounted on the bearing 47 by suitable means. The lower end of the lever 112 has a rounded projection 116 which engages a step 117 of end portion 70 of the actuator member 73 in inward force imparting relation when the sleeve 26 and the yoke 34 are shifted by the camming action of roller pin 27.

The movement of the spring loaded reciprocally mounted yoke 34 therefore not only trips the catch member 79 through the rod 44 releasing the spring 71 for reversal of the drive, but it is also directly communicated through the linkage to the actuator member 73 and the guide 74 for simultaneous effort on the shifting or dog clutch member 19 for ready release of the same from the driven clutch member 23. Such assistance is advisable and necessary to insure disengagement of rotational drive in the direction of valve closure member in spite of the loading of the engaging clutch members as resisting torque is being applied to shaft 13. This assembly thereby eliminates sticking and possible injury of the clutch members and reduces wear on the same, particularly for the higher torque settings.

It should also be noted that link member 110 is adjustable as to its length, being formed of an outer and inner part 119 and 120, respectively, the latter member receiving a threaded extension of the former. A locknut 121 secures the length selected. The clutch release assembly is therefore adjustable, the amount of movement and the force transmitted from the reciprocal yoke 34 being variable according to the length of the link member 110.

A conventional counter 123 is conveniently mounted on the valve testing machine as on the bearing 14, and is connected to a reciprocating portion as the actuator end 70 by means of a rod 124, for recording the number of opening and closing operations performed, for instance, on a particular valve.

An equalizer assembly generally designated 127 is provided on the side opposite reversing springs 69 and 71 to balance or equalize the off-center forces applied to the dial assembly 55 by said springs which would otherwise place the dial assembly and the threaded portion of the shaft 13 under stress causing excessive wear and unreliable operation.

The equalizer assembly comprises an extensible casing 128 mounted between the post 129 which is secured to the base plate 10 by suitable means and an extending portion 130 of the dial assembly. Within the casing and exerting endwise force on the extending portion 130 is a coil spring 131 of sufficient stiffness to balance or overcome the combined moment placed on the dial assembly by the springs 69 and 71. As the latter springs are compressed by the inward movement of the dial assembly, the equalizer spring is also compressed, relieving the dial assembly of the objectionable tendency to cant on the shaft threads, thus providing for smoother operation and longer life for the affected parts.

As herein described, the valve tester device is most suitable for testing valve packing, stem friction and the like. If it is desired to test the closure member and seat for fluid tightness after a number of opening and closing operations of the valve, a timing device, such as a repeating cycle timer can easily be connected to the power supply of the electric motor to intermittently operate the same by providing for a shut-off when the valve is in the closed position. Thus, any leaks through the valve will be detected during the shut-off period of the motor. To synchronize motor shut-off with the closing of the valve, the timing device can be electrically connected to the shiftable member 73, thereby being operable when member 73 is in a position corresponding to the closed position of the valve.

The above timing arrangement is essentially an electrical connection between the novel assembly constituting this invention and the electric motor used to drive the same. It is of a conventional nature, is not deemed to be a part of the invention, and accordingly, it is not deemed necessary to show it in the drawings.

It should be noted that employment of a timing device, as described above, may require a lost motion connection between shaft 13 and the valve stem connected thereto. Thus, the momentum of the machine and driving motor after shaft reversal will be expended in lost motion rather than being directly transmitted to the valve after the latter has fully closed. Such a lost motion connection merely insures that the valve is closed and prevents the machinery momentum from opening the valve after the motor is shut off by the timing device. This lost motion connection may consist of a running thread connection between shaft 13 and the valve stem, the threads being on an intermediate sleeve provided with a keyway to permit axial movement of the threaded connection.

It should be apparent also that there is herein provided an automatic shaft reverser and torque limiter which operates off a constant, single directional driving force. It should be further clear that the driving force may be continually applied to the machine even while the driven shaft section 29 is prevented from rotating by said resisting torque and with no damage resulting. The latter provision is a desirable feature of the cam operation which allows one section 31 of the shaft 13 to rotate while the other section 29 is stationary.

Although this invention has been described and illustrated in one form, such as a valve testing machine, it need not be so limited inasmuch as it is susceptible to many changes and applications of use without departing from the spirit and scope of the invention as measured by the appended claims.

I claim:

1. A combination shaft reverser and torque limiter machine comprising axially aligned shaft sections, a pair of spaced members mounted on one of said shaft sections for rotational movement relative thereto, means for effecting opposite rotation of said spaced members, shiftable means mounted on said shaft section intermediate said spaced members for rotation with said shaft section and having alternate engagement with each of said spaced members whereby said shaft section may be driven in opposite directions, means connecting said shaft section with a second shaft section for providing substantial unitary rotation of the two sections, said means including abutment means on said first shaft section and an axially movable member rotatively secured to said second shaft section and normally in abutting driving relation with said abutment means, means for yieldingly holding said axially movable member in said abutting relation, said holding means including a member which is reciprocally mounted on said second shaft section, said abutting means and axially movable member being adapted to engage each other upon application of a predetermined resisting torque to said second shaft section so as to axially displace said movable member and also the reciprocally mounted member of said holding means, means cooperating with said reciprocally mounted member for cushioning the return of the same to its original position and of said axially movable member to its normal driving relation with said abutting means after withdrawal of said resisting torque, spring loaded actuator means for shifting said shiftable means alternately to the extreme positions and in driving engagement with said spaced members, means cooperating with said first shaft section and operable by rotation thereof for actuation of said actuator means in one direction, and means cooperating with the reciprocally mounted member of said holding means and operable by said axial displacement thereof for movement of said actuator means in the opposite direction for opposite rotation of the shaft sections.

2. A combination shaft reverser and torque limiter machine comprising axially aligned shaft sections, a pair of spaced members mounted on one of said shaft sections for rotational movement relative thereto, means for effecting opposite rotation of said spaced members, shiftable means mounted on said shaft section intermediate said spaced members for rotation with said shaft section and having alternate engagement with each of said spaced members whereby said shaft section may be driven in opposite directions, means connecting said shaft section with a second shaft section for providing substantial unitary rotation of the two sections, said means including abutment means on said first shaft section and an axially movable member rotatively secured to said second shaft section and normally in abutting driving relation with said abutment means, means for yieldingly holding said axially movable member in said abutting relation, said holding means including a member which is reciprocally mounted on said second shaft section and resilient means operating said latter member, said abutting means and axially movable member being adapted to engage each other upon application of a predetermined resisting torque to said second shaft section so as to axially displace said movable member and also the reciprocally mounted member of said holding means, said holding means including adjustment means for varying the loading of said resilient means and consequently changing the resisting torque necessary for said axial displacement and indicator means for predeterminately setting the desired maximum resisting torque to be applied to said shaft section, means cooperating with said reciprocally mounted member for cushioning the return of the same to its original position and of said axially movable member to its normal driving relation with said abutting means after withdrawal of said resisting torque, spring loaded actuator means for shifting said shiftable means alternately to the extreme positions and in driving engagement with said spaced members, means cooperating with said first shaft section and operable by rotation thereof for actuation of said actuator means in one direction, and means cooperating with the reciprocally mounted member of said holding means and operable by said axial displacement thereof for movement of said actuator means in the opposite direction for opposite rotation of the shaft sections.

3. A combination shaft reverser and torque limiter machine comprising axially aligned shaft sections, a pair of spaced members mounted on one of said shaft sections for rotational movement relative thereto, means for effecting opposite rotation of said spaced members, shiftable means mounted on said shaft section intermediate said spaced members for rotation with said shaft section and having alternate engagement with each of said spaced members whereby said shaft section may be driven in opposite directions, means connecting said shaft section with a second shaft section for providing substantial unitary rotation of the two sections, said means including abutment means on said first shaft section and an axially movable member rotatively secured to said second shaft section and normally in abutting driving relation with said abutment means, means for yieldingly holding said axially movable member in said abutting relation, said holding means including a member which is reciprocally mounted on said second shaft section, said abutting means and axially movable member being adapted to engage each other upon application of a predetermined resisting torque to said second shaft section so as to axially displace said movable member and also the reciprocally mounted member of said holding means, spring loaded actuator means for shifting said shiftable means alternatively to the extreme positions and in driving engagement with said spaced members, means cooperating with said first shaft section and operable by rotation thereof for actuation of said actuator means in one direction, means cooperating with the reciprocally mounted member of said holding means and operable by said axial displacement thereof for actuation of said actuator means in the opposite direction for opposite rotation of the shaft sections, and means cooperating with said reciprocally mounted member for effecting direct transmission of the motion and force of said axial displacement thereof to said actuator means for positive disengagement of said shiftable means from one of said spaced members.

4. A combination shaft reverser and torque limiter machine comprising axially aligned shaft sections, a pair of spaced members mounted on one of said shaft sections for rotational movement relative thereto, means for effecting opposite rotation of said spaced members, shiftable means mounted on said shaft section intermediate said spaced members for rotation with said shaft section and having alternate engagement with each of said spaced members whereby said shaft section may be driven in opposite directions, means connecting said shaft section with a second shaft section for providing substantial unitary rotation of the two sections, said means including abutment means on said first shaft section and an axially movable member rotatively secured to said second shaft section and normally in abutting driving relation with said abutment means, means for yieldingly holding said axially movable member in said abutting relation, said holding means including a member which is reciprocally mounted on said second shaft section and resilient means operating on said latter member, said abutting means and axially movable member being adapted to engage each other upon application of a predetermined resisting torque to said second shaft section so as to axially displace said movable member and also the reciprocally mounted member of said holding means, said holding means including adjustment means for varying the loading of said resilient means and consequently changing the resisting torque necessary for said axial displacement and indicator means for predeterminately setting the desired maximum resisting torque to be applied to said shaft section, spring loaded actuator means for shifting said shiftable means alternatively to the extreme positions and in driving engagement with said spaced members, means cooperating with said first shaft section and operable by rotation thereof for actuation of said actuator means in one direction, means cooperating with the reciprocally mounted member of said holding means and operable by said axial displacement thereof for actuation of said actuator means in the opposite direction for opposite rotation of the shaft sections, and means cooperating with said reciprocally mounted member for effecting direct transmission of the motion and force of said axial displacement thereof to said actuator means for positive disengagement of said shiftable means from one of said spaced members.

5. The subject matter of claim 1 including means cooperating with said reciprocally mounted member for effecting direct transmission of the motion and force of said axial displacement thereof to said actuator means for positive disengagement of said shiftable means from one of said spaced members.

6. A combination shaft reverser and torque limiter machine comprising axially aligned shaft sections, a pair of spaced members mounted on one of said shaft sections for rotational movement relative thereto, each of said members including clutch means, means for effecting simultaneous opposite rotation of said spaced members, a shiftable double clutch member mounted on the said shaft section intermediate said spaced members for rotation with said shaft section and alternate engagement with each of the clutch means of said spaced members whereby said shaft section may be driven in opposite directions, means connecting said shaft section with a second shaft section for substantial unitary rotation of the two sections, said means including abutting means on the first shaft section and an axially movable sleeve rotatably secured to said second shaft section and having surface means for abutting driving relation with said abutting means, means for yieldingly holding said sleeve in said abutting relation, said holding means including a non-rotatable yoke which is reciprocally mounted on said second shaft section, said abutting means and the surface means of said sleeve being adapted to engage each other upon application of a predetermined resisting torque to said second shaft section so as to axially displace said sleeve and also said yoke, means cooperating with said yoke for cushioning the return of the same to its original position and of said sleeve to its normal driving relation with said pin after withdrawal of said resisting torque, said means comprising a casing, resilient means mounted therein and extending therefrom for contact by said yoke, threaded supporting means for said casing, said casing being axially adjustable thereon, mounting means for positioning said supporting means relative to the rest of the machine, actuator means for shifting said double clutch member alternately into each of the extreme positions thereof, said means including at least two springs for the actuation thereof and catch means to secure the same against action of said springs, means cooperating with said first shaft section and operable by rotation thereof in one direction first to load said springs and subsequently to release said catch allowing one of said springs to shift said actuator means and double clutch member to the opposite extreme positions thereof, and means cooperating with said reciprocally mounted yoke and operable by said axial displacement thereof to again release said catch allowing the other of said springs to shift the said actuator means and clutch member to the other extreme positions thereof for opposite rotation of said shaft sections.

7. A combination shaft reverser and torque limiter machine comprising axially aligned shaft sections, a pair of spaced members mounted on one of said shaft sections for rotational movement relative thereto, each of said members including clutch means, means for effecting simultaneous opposite rotation of said spaced members, a shiftable double clutch member mounted on the said shaft section intermediate said spaced members for rotation with said shaft section and alternate engagement with each of the clutch means of said spaced members whereby said shaft section may be driven in opposite directions, means connecting said shaft section with a second shaft section for providing substantial unitary rotation of the two sections, said means including abutting means on the first shaft section and an axially movable sleeve rotatably secured to said second shaft section and having surface means for abutting driving relation with said abutting means, means for yieldingly holding said sleeve in said abutting relation, said holding means including a non-rotatable yoke, the latter member being reciprocally mounted on said second shaft section, said abutting means and the surface means of said sleeve being adapted to engage each other upon application of a predetermined resisting torque to said second shaft section so as to axially displace said sleeve and also said yoke, actuator means for shifting said double clutch member alternately into each of the extreme positions thereof, said actuator means including at least two springs for the actuation thereof and catch means to secure the same against action of said springs, means cooperating with said first shaft section and operable by rotation thereof in one direction first to load the said springs and subsequently to release said catch allowing one of said springs to shift said actuator means and double clutch member to the opposite extreme positions thereof, means cooperating with said reciprocally mounted yoke and operable by said axial displacement thereof to again release said catch allowing the other of said springs to shift the actuator means and clutch member to the other extreme positions thereof for opposite rotation of said shaft sections, means cooperating with said yoke for effecting transmission of the motion and force of said axial displacement thereof to said actuator means for positive disengagement of said shiftable clutch member from the clutch means of one of said spaced members, said yoke cooperating means comprising link means connected to said yoke, lever means connected to said link means, fixed fulcrum means for said lever means, said lever means being adapted to press against a portion of said actuator means during said axial displacement of said yoke.

8. The subject matter of claim 6 including additional means cooperating with said yoke for effecting transmission of the motion and force of said axial displacement thereof to said actuator means for positive disengagement of said shiftable clutch member from the clutch means of one of said spaced members, said additional means comprising link means connected to said yoke, lever means connected to said link means, fixed fulcrum means for said lever means, said lever means being adapted to press against a portion of said actuator means during said axial displacement of said yoke.

9. A combination shaft reverser and torque limiter machine comprising axially aligned shaft sections, a pair of spaced members mounted on one of said shaft sections for rotational movement relative thereto, each of said members including clutch means, means for effecting simultaneous opposite rotation of said spaced members, a shiftable double clutch member mounted on the said shaft section intermediate said spaced members for rotation with said shaft section and alternate engagement with each of the clutch means of said spaced members whereby said shaft section may be driven in opposite directions, means connecting said shaft section with a second shaft section for substantial unitary rotation of the two sections, said means including abutting means on the first shaft section and an axially movable sleeve rotatably secured to said second shaft section and having surface means for abutting driving relation with said abutting means, means for yieldingly holding said sleeve in said abutting relation, said holding means including a non-rotatable yoke which is reciprocally mounted on said second shaft section and resilient means operating on said yoke, said abutting means and the surface means of said sleeve being adapted to engage each other upon application of a predetermined resisting torque to said second shaft section so as to axially displace said sleeve and also said yoke, said holding means including adjustment means for varying the loading of said resilient means and consequently changing the resisting torque necessary for said axial displacement and indicator means for predeterminately setting the desired maximum resisting torque to be applied to said shaft section, means cooperating with said yoke for cushioning the return of the same to its original position and of said sleeve to its normal driving relation with said pin after withdrawal of said resting torque, said means comprising a casing, resilient means mounted therein and extending therefrom for contact by said yoke, threaded supporting means for said casing, said casing being axially adjustable thereon, mounting means for positioning said supporting means relative to the rest of the machine, actuator means for shifting said double clutch member alternately into each of the extreme positions thereof, said means including at least two springs for the actuation thereof and catch means to secure the same against action of said springs, means cooperating with said first shaft section and operable by rotation thereof in one direction first to load said springs and subsequently to release said catch allowing one of said springs to shift said actuator means and double clutch member to the opposite extreme positions thereof, and means cooperating with said reciprocally mounted yoke and operable by said axial displacement thereof to again release said catch allowing the other of said springs to shift the said actuator means and clutch member to the other extreme positions thereof for opposite rotation of said shaft sections, additional means cooperating with said yoke for effecting transmission of the motion and force of said axial displacement thereof to said actuator means for positive disengagement of said shiftable clutch member from the clutch means of one of said spaced members, said additional means comprising link means connected to said yoke, lever means connected to said link means, fixed fulcrum means for said lever means, said lever means being adapted to press against a portion of said actuator means during said axial displacement of said yoke.

10. A combined shaft reversing and torque limiting machine, the combination comprising essentially a pair of parallel shaft sections, each of the said shaft sections having a spaced member mounted for rotational movement relative to the shaft, the said spaced members being oppositely rotatable, the said shaft sections having shiftable means thereon intermediate the said spaced members rotatable with the said shaft sections, the said shiftable means being predeterminately engageable with said spaced members to permit said shaft sections to be driven in opposite directions, coupling means cooperating with the said shaft sections whereby the latter sections may be moved unitarily, said coupling means including a member axially movable on one of said shaft sections and mounted in shoulder relation on the other of said shaft sections, means on one of the shaft sections for retaining said axially movable member in said shoulder relation upon application to one of the shaft sections of a predetermined resisting torque to thereby displace said movable member and a portion of said retaining means, resilient actuator means for moving said shiftable means predeterminately to end limit positions in driving engagement with the spaced members, one of the shaft sections having means operable for effecting movement of said actuator means, the said retaining means having means operable by movement of said retaining means to effect movement of the actuator means in an opposite direction to rotate said shaft sections in an opposite direction.

JULIUS A. HJULIAN.

No references cited.